Dec. 5, 1950 A. RUFOLO 2,532,336
DIELECTRIC TEST APPARATUS
Filed April 20, 1945 2 Sheets-Sheet 1
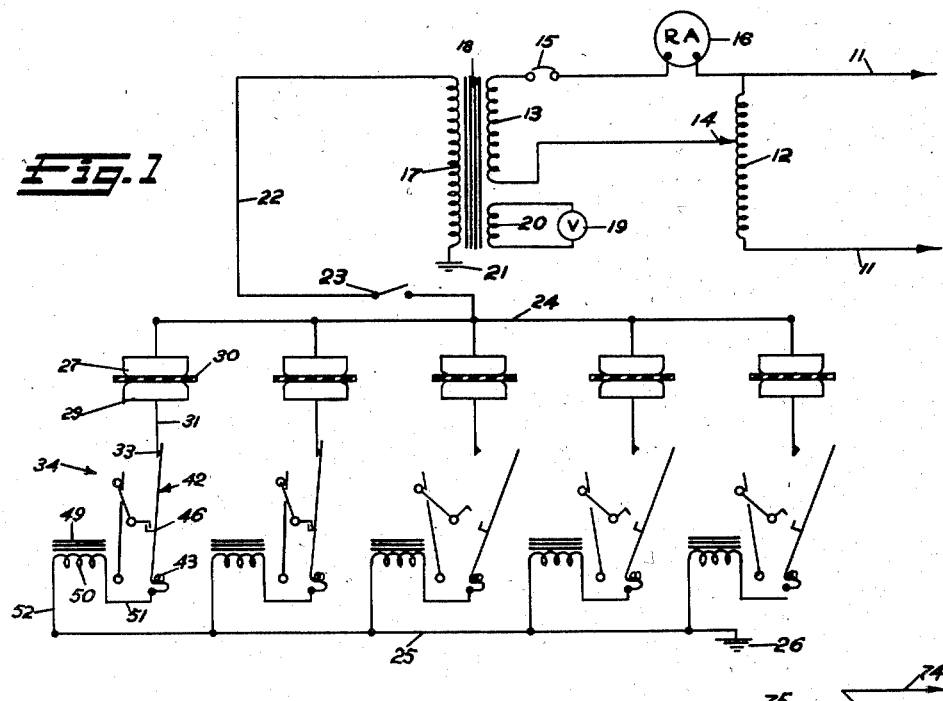
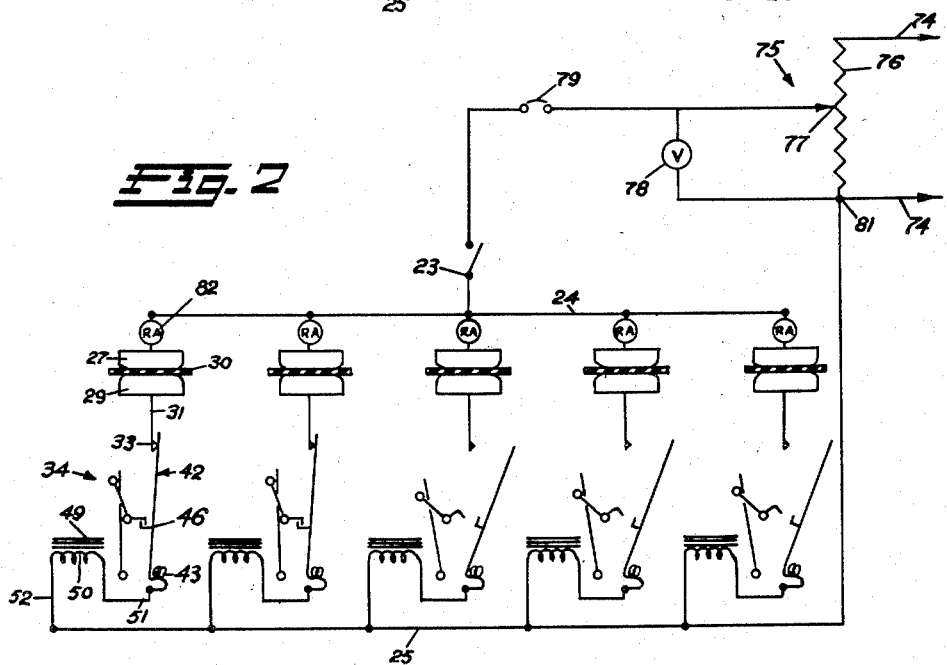
INVENTOR.
Anthony Rufolo
BY
Ralph L. Chappell
ATTORNEY

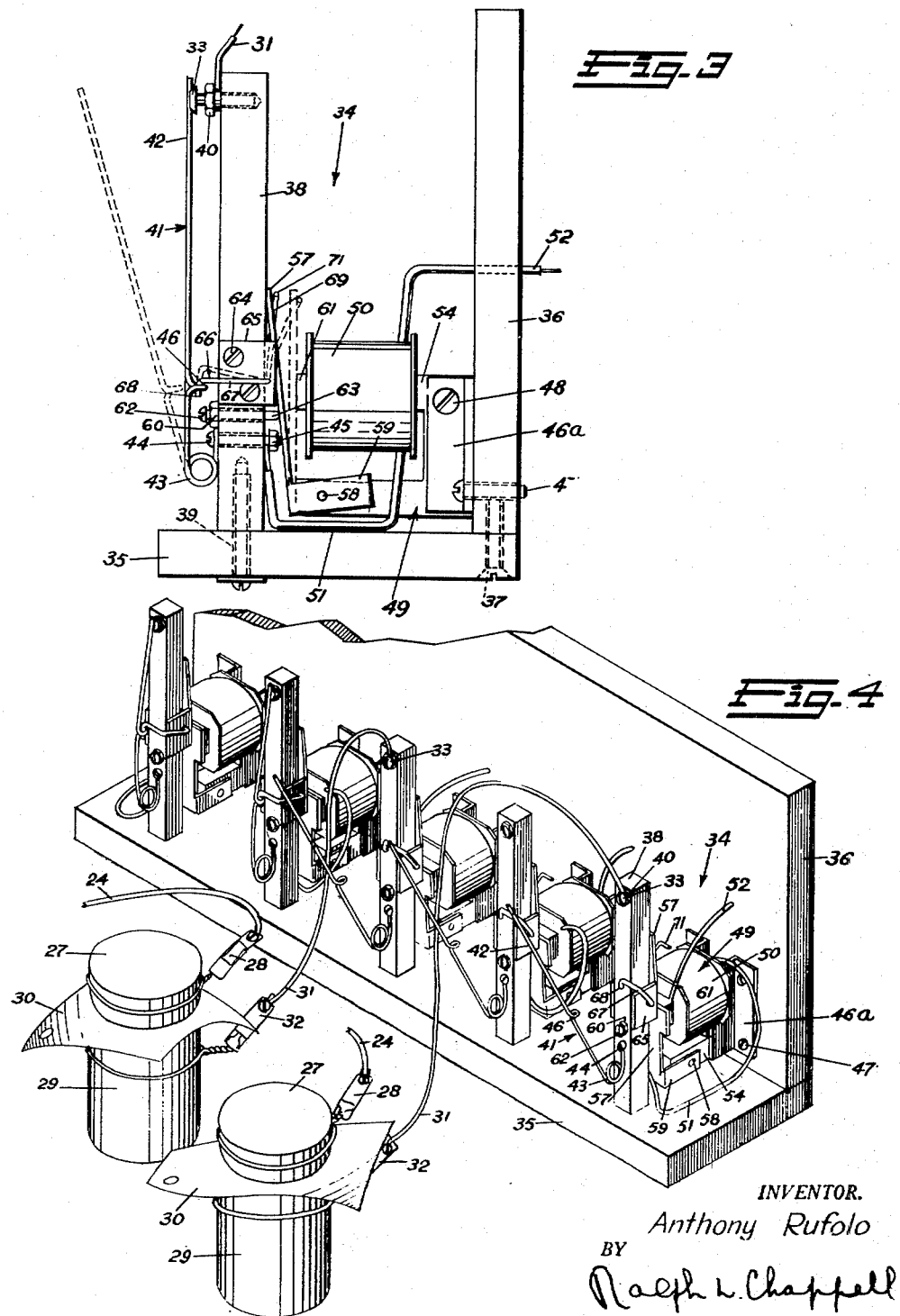

Patented Dec. 5, 1950

2,532,336

UNITED STATES PATENT OFFICE 2,532,336

DIELECTRIC TEST APPARATUS

Anthony Rufolo, New York, N. Y.

Application April 20, 1945, Serial No. 589,447

3 Claims. (Cl. 175—183)

(Granted under the act of March 3, 1883, as amended April 30, 1928; 370 O. G. 757)

This invention concerns an apparatus and system for testing the dielectric properties of electrical insulating materials, and in particular this invention concerns a completely automatic apparatus for testing several specimens simultaneously.

In an apparatus of the type described it is essential that a known and controlled electrical stress be imposed continuously upon each specimen being tested and it is further essential that a record be made of the time lapse between initial application of electrical stress to each specimen and the time at which the specimen fails dielectrically. It is a further requirement that upon dielectric failure of any specimen the electrical stress be immediately cut off to prevent unnecessary damage to the specimen so that subsequent investigation thereof indicates the manner in which it failed. It is a necessary requirement that electrical stress on any one specimen be cut off with a minimum time delay and with a minimum disturbance of electrical stress on other specimens in the same test run. The present apparatus, which affords minimum time delay, is an improvement over prior apparatuses using fuses since the latter require relatively long time delays for melting the fuses, especially at small currents, and produce a long flash due to high voltage stress with consequent additional time delay at cut off of electrical stress. Cutting off electrical stress upon failure of the specimen also eliminates waste of power by leakage through the specimen and prevents damage to other parts of the circuit by excessive current flow through the specimen.

In order to secure test results representative of the type of material being tested it is necessary that tests be run on a number of specimens so that an average of the results obtained can be computed, and such tests run upon separate specimens must be performed under identical conditions in order that the results obtained be accurate, reproducible and afford a true comparison between the specimens. It is preferable, therefore, that several specimens be tested simultaneously in the same apparatus. It is highly desirable that the apparatus used in performing such tests be completely automatic in order that human errors in manipulation be eliminated and that a maximum of accuracy and reproducibility be achieved and in order that when tests be conducted over long periods constant attendance of an operator is not necessary.

An object of this invention is to provide an apparatus and system for simultaneously testing the dielectric properties of several specimens of electrical insulating material.

A further object is to perform such tests upon multiple specimens under identical conditions whereby all variable factors including electrical stress imposed upon the samples are controlled.

A further object is to provide an apparatus that upon dielectric failure of a specimen automatically cuts off electrical stress imposed upon such specimen.

A further object is to provide an apparatus that records the time lapse between initially imposing electrical stress upon any specimen and dielectric failure thereof.

A further object is to provide an apparatus that is completely automatic in all respects whereby after initial adjustment the apparatus performs the tests and records the results without requiring the attendance of an operator.

Further objects and advantages of this invention, as well as its construction, arrangement and operation, are apparent from the following description and claims in connection with the accompanying drawings, in which:

Fig. 1 is a diagrammatic view of a preferred form of apparatus using alternating current as a source of electrical power.

Fig. 2 is a diagrammatic view of a preferred form of apparatus using direct current as a source of electrical power.

Fig. 3 is a view in side elevation showing a preferred form of apparatus such as illustrated in Fig. 1.

Fig. 4 is an isometric view of a preferred form of apparatus such as illustrated in Figs. 1 and 3.

In Fig. 1, there are shown electrical conductors 11 leading to a suitable source of alternating current (not shown), an impedance 12 across said lines and transformer primary winding 13 arranged in parallel across impedance 12 by means of a sliding contact 14, whereby potential in primary winding 13 can be varied and controlled by manipulation of slide contact 14. Connected in series with primary winding 13 is a circuit breaker 15 arranged to open upon overloading of the primary winding 13. Also in series with primary winding 13 is a recording ammeter 16, arranged to make a continuous record of the flow of current in the described circuit on a time chart (not shown). Secondary transformer winding 17 and a transformer core 18 complete the transformer including primary winding 13. A voltmeter 19 is connected to the transformer by winding 20 and is arranged to indicate the potential in secondary transformer winding 17. One end of secondary winding 17 is grounded at 21.

A conductor 22 is connected through a main switch 23 to a feeder line 24. A return line 25 is grounded at 26. Arranged in parallel across lines 24 and 25 are shown five individual circuits each of which is designed to impose stress on a single sample of material to be tested, and one of these circuits will now be described with reference to Figs. 1, 3 and 4.

An electrode 27 is connected to feeder line 24 by means of a clip 28 (Fig. 4) and is arranged with a second electrode 29 to have a specimen 30 of material to be tested sandwiched therebetween and in electrical contact therewith. A conductor 31 connects clip 32 (Fig. 4) on electrode 29 with a contact 33 mounted on a circuit breaker 34.

The circuit breaker 34 is described and claimed in my copending application, Serial No. 708,365, filed November 7, 1946, for Circuit Breaker.

The five circuit breakers 34 included in the five circuits arranged in parallel across lines 24 and 25 are mounted upon a common Bakelite baseplate 35 (Figs. 3 and 4) having a vertically disposed Bakelite panel 36 secured thereto by means of screws 37. Mounted upon baseplate 35 and in spaced relation from panel 36 and from each other are five Bakelite columns 38 secured in place by screws 39 and each forming a support for a single circuit breaker 34. A single circuit breaker 34 will now be described.

Contact 33 is positioned at the top of its supporting column 38 and may be adjusted relative to column 38 by screwing therein. A locknut 40 is provided for locking contact 33 in place. A switch arm 41 is provided with a movable portion 42 arranged for movement relative to contact 33 whereby it can be electrically engaged with contact 33 as shown in solid lines (Fig. 3) or can be sprung away from contact 33 as shown in dotted lines in the same view. The lower portion of switch arm 41 is formed into convolutions 43, which afford a spring action for actuating the movable portion 42 away from contact 33. The free end of convolutions 43 is secured to column 38 by means of a bolt 44 and a nut 45 and movable portion 42 of contact arm 41 is provided with a lateral offset loop portion 46. Switch arm 41 including convolutions 43 can be formed from spring wire if desired and preferably is made from bronze.

A bracket 46a is secured to panel 36 by means of screws 47. Secured to bracket 46a by means of screws 48 is a relay 49 having a horseshoe core 54. On the upper leg of core 54 is mounted a winding 50. An electrical conductor 51 connects winding 50 in series with bolt 44 and switch arm 41, the other end of winding 50 being connected through conductor 52 to line 25. An armature 57 having an offset 59 is pivoted at 58 on the lower leg of horseshoe core 54. Armature 57 extends adjacent pole piece 61 of core 54. Armature 57 is adapted upon energizing of winding 50 and magnetizing of core 54 to be attracted to pole piece 61 in the dotted line position shown in Fig. 3, and upon deenergizing of winding 50 and demagnetizing of core 54 the armature 57 can be withdrawn away from pole piece 61 into the solid line position shown in Fig. 3. Horseshoe core 54 and armature 57 pivoted thereon form a substantially closed magnetic circuit, thereby increasing the magnetic efficiency of relay 49. An adjustment screw 62 having a stop surface 63 is threaded in column 38 and serves to adjust the limit of throw of armature 57 away from pole piece 61. A locknut 60 secures screw 62 in adjusted position.

Secured to column 38 by screws 64 is a bracket 65. Mounted for rotation in bracket 65 is a bellcrank latch 66 having an arm 67 provided with a terminal offset 68 adapted to hook into loop 46 of switch arm 41 to retain the latter in the solid line position shown in Fig. 3. Bell-crank latch 66 is provided with another arm 69 having a terminal offset 71 adapted to hook about armature 57 in sliding engagement therewith. If desired, armature 57 can be adjusted to leave a small space between itself and offset 71 so that latch 66 can be moved by a striking action of armature 57 upon offset 71.

Circuit breaker 34 can be set in closed circuit position (solid line position in Fig. 3) when current is not flowing through the device by actuating switch arm 41 into electrical engagement with contact 33 against the action of spring convolutions 43 and hooking offset 68 of latch 66 into engagement with loop 46 of switch arm 41, whereby arm 69 of latch 66 withdraws armature 57 away from pole piece 61. If desired, armature 57 can be designed to rest of its own weight against stop surface 63.

Flow of current through the circuit breaker trips off the device into the dotted line position shown in Fig. 3 since current flowing through relay windings 50 magnetizes core 54 and causes pole piece 61 to attract armature 57 with the result that latch 66 is rotated slightly clockwise so that offset 68 of latch 66 disengages loop 46 of switch arm 41 to allow the latter to spring away from contact 33 and break the circuit.

In Fig. 2 is shown an arrangement for using direct current as a power source, most of the apparatus having the same parts shown in connection with the alternating current apparatus illustrated in Figs. 1, 3 and 4. Identical reference numbers are used to indicate identical parts in all Figs. Variations in the arrangement shown in Fig. 2 will now be described.

Electrical conductors 74 lead to a suitable source of direct current (not shown). A potentiometer 75 is in the circuit and consists of a resistance 76 connected across lines 74 and a variable contact 77. The potentiometer is arranged to provide a variable and controlled potential for testing electrical insulating specimens 30. A voltmeter 78 is connected in parallel across the potentiometer to indicate the controlled voltage. Circuit breaker 79 opens the circuit upon overloading therein.

A further deviation from the electrical arrangement shown in Fig. 1 is found in connection of return line 25 to the potentiometer at 81 instead of grounding as indicated at 26 in Fig. 1, though such an arrangement is optional and line 25 and potentiometer 75 can be grounded if desired.

Another deviation in the electrical arrangement is the use of an individual recording ammeter 82 in series with each specimen 30 and circuit breaker 34 instead of using a single ammeter 16 as shown in Fig. 1. This arrangement likewise is optional and a single ammeter can be used if desired, such single ammeter being inserted in the same line as switch 23 and circuit breaker 79, and in series therewith.

Operation of the apparatus is as follows: In the alternating current apparatus of Figs. 1, 3 and 4, with main switch 23 open, specimens 30 are placed in position with each specimen sandwiched between an electrode 27 and an electrode 29 and in electrical contact therewith. Electrode 27 is connected by clip 28 to feeder line 24. Electrode 29 is connected by clip 32 and conductor 31 to contact 33 of circuit breaker 34. Return line 25 is grounded at 26 in a suitable manner.

Circuit breaker 34 is set in closed-circuit position by moving switch arm 42 into electrical engagement with contact 33 and rotating latch 66 counterclockwise until offset portion 68 hooks into loop 46 of switch arm 41, whereby armature 57 is withdrawn away from pole piece 61.

When circuit breaker 15 is placed in closed circuit position, electrical conductors 11 connected to a suitable alternating-current source (not shown), transformer secondary winding 17 grounded, main switch 23 closed, and sliding contact 14 actuated along impedance 12 to provide the desired potential as indicated by voltmeter 19 for stressing insulating samples 30, the recording ammeter 16 operates to record any current flow within the circuit on a time chart. With the above adjustments the apparatus functions automatically without requiring the attendance of an operator until the test upon all of the specimens is completed.

Upon dielectric failure of any specimen 30 the following sequence of actions occurs. Dielectric failure of specimen 30 permits a momentary surge of current through the entire electric circuit including specimen 30 and relay 49 is energized with the result that pole piece 61 becomes magnetized and attracts armature 57 into the dotted-line position shown in Fig. 3. This causes rotation of latch 66 to withdraw offset portion 68 thereof out of hooking engagement with loop 46 whereupon switch arm 41 springs into the dotted line position in Fig. 3 under the influence of spring convolutions 43 so that portion 42 thereof moves out of electrical engagement with contact 33 to open the electrical circuit and prevent further flow of current therethrough. Circuit breaker 34 is constructed so that it is actuated instantaneously upon dielectric failure of specimen 30, with the result that specimen 30 is not damaged by continued flow of current therethrough and it is possible by an inspection of the specimen to determine the manner of failure thereof. In the event that high potential is used in testing specimen 30, circuit breaker 34 is arranged so that it is actuated at a low current flow, for example about 40 milliamperes, to prevent excessive flow of current in primary winding 13, and circuit breaker 34 is arranged to cause the rapid breaking of electrical contact at contact 33 to prevent excessive arcing. Furthermore, adequate space is provided between contact 33 and movable portion 42 of switch arm 41 when in the dotted line position shown in Fig. 3 so that flashover is prevented. Windings 50 of relay 49 are provided with sufficient insulation to permit use of a high voltage, for example, 15,000 volts, without breakdown of the insulation.

Momentary surging of current through the circuit upon failure of specimen 30 causes recording ammeter 16 to make a record of such current surge at the time when it occurred. Successive failure of other samples causes recording ammeter 16 to make further records of the time at which such failure occurs. With a single recording ammeter 16 as shown in circuit of Fig. 1, it is not possible to identify a time of failure indicated on recording ammeter 16 with the particular specimen which failed at such time. However, in the arrangement shown in Fig. 2, where a seperate recording ammeter 82 is provided in series with each specimen 30, the time of failure recorded on any recording ammeter 82 is positively identified with the particular sample which failed at such time.

Since multiple samples are tested simultaneously under identical conditions a computed average of the results represented by recording ammeter 16 and voltmeter 19 gives a true indication of the dielectric properties of the material being tested and deviations from normal of individual samples do not cause error in the final result.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. An electrical system for testing the dielectric properties of insulating material, said system including a power-input circuit and a power-utilization circuit; said power-utilization circuit comprising a feeder line, a return line, a plurality of pairs of electrodes connected in parallel between said feeder line and said return line, each pair of electrodes being adapted to have a test specimen disposed therebetween, said electrodes and test specimen under normal conditions forming a static condenser, a plurality of circuit breakers one in series with each of said pairs of electrodes between said feeder line and said return line, each circuit breaker being connected for actuation by current flow through its corresponding pair of electrodes to break the circuit through the pair of electrodes between said feeder line and said return line; and a recording time galvanometer in one of said circuits for recording the time of current flow through a specimen.

2. An alternating current electrical system for testing the dielectric properties of insulating material, said system including an alternating current power-input circuit and an alternating current power-utilization circuit; said power-utilization circuit comprising a feeder line, a return line, a plurality of pairs of electrodes connected in parallel between said feeder line and said return line, each pair of electrodes being adapted to have a test specimen disposed therebetween, said electrodes and test specimen under normal conditions forming a static condenser, a plurality of circuit breakers one in series with each of said pairs of electrodes between said feeder line and said return line, each circuit breaker being connected for actuation by current flow through its corresponding pair of electrodes to break the circuit through the pair of electrodes between said feeder line and said return line; and a recording time galvanometer in said power-input circuit for recording the time of current flow through a specimen.

3. A direct current electrical system for testing the dielectric properties of insulating material, said system including a direct current power-input circuit and a direct current power-utilization circuit; said power-utilization circuit comprising a feeder line, a return line, a plurality of pairs of electrodes connected in parallel between said feeder line and said return line, each pair of electrodes being adapted to have a test specimen disposed therebetween, said electrodes and test specimen under normal conditions forming a static condenser, a plurality of circuit breakers one in series with each of said pairs of electrodes between said feeder line and said return line, each circuit breaker being connected for actuation by current flow through its corresponding pair of electrodes to break the circuit through the pair of electrodes between said feeder line and said return line; and a plurality of recording time galvanometers one in series with each of said pairs of electrodes between said feeder line and said return line for recording the time of current flow through a specimen between the corresponding electrodes.

ANTHONY RUFOLO.

REFERENCES CITED

The following references are of record in the file of this patent:

UNITED STATES PATENTS

| Number | Name | Date |
| --- | --- | --- |
| 462,504 | Olan | Nov. 3, 1891 |
| 493,009 | Bedell | Mar. 7, 1893 |
| 1,561,483 | Pickard | Nov. 17, 1925 |
| 1,897,850 | La Pierre | Feb. 14, 1933 |
| 1,944,211 | Brodie | Jan. 23, 1934 |
| 2,043,528 | Davis | June 9, 1936 |
| 2,220,489 | Lowkrantz | Nov. 5, 1940 |
| 2,298,031 | Bousman | Oct. 6, 1942 |
| 2,306,529 | Davis | Dec. 29, 1942 |

FOREIGN PATENTS

| Number | Country | Date |
| --- | --- | --- |
| 231,473 | Great Britain | Sept. 3, 1925 |